W. V. TURNER.
FLUID OPERATED BRAKE.
APPLICATION FILED MAR. 30, 1915.

1,185,737.

Patented June 6, 1916.
2 SHEETS—SHEET 1.

WITNESSES:
H. W. Crowell
A. M. Clements.

INVENTOR.
Walter V. Turner
BY Wm. H. Cady
ATTORNEY.

W. V. TURNER.
FLUID OPERATED BRAKE.
APPLICATION FILED MAR. 30, 1915.

1,185,737.

Patented June 6, 1916.
2 SHEETS—SHEET 2.

WITNESSES:
H. W. Crowell
G. M. Clements

INVENTOR.
Walter V. Turner
BY Wm. M. Cady
ATTORNEY.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-OPERATED BRAKE.

1,185,737.  Specification of Letters Patent.  Patented June 6, 1916.

Application filed March 30, 1915. Serial No. 18,030.

*To all whom it may concern:*

Be it known that I, WALTER V. TURNER, a citizen of the United States, residing at Edgewood, in the county of Allegheny and State of Pennsylvania, have invented new and useful Improvements in Fluid-Operated Brakes, of which the following is a specification.

This invention relates to fluid pressure brakes, and more particularly to a brake controlling valve device adapted to secure a high braking power in an emergency application of the brakes. For the purpose, it has heretofore been proposed to supply two brake cylinders, one for service applications, and both for an emergency application.

The principal object of my invention is to provide improved means for controlling the brakes where two brake cylinders are employed.

Figure 1:
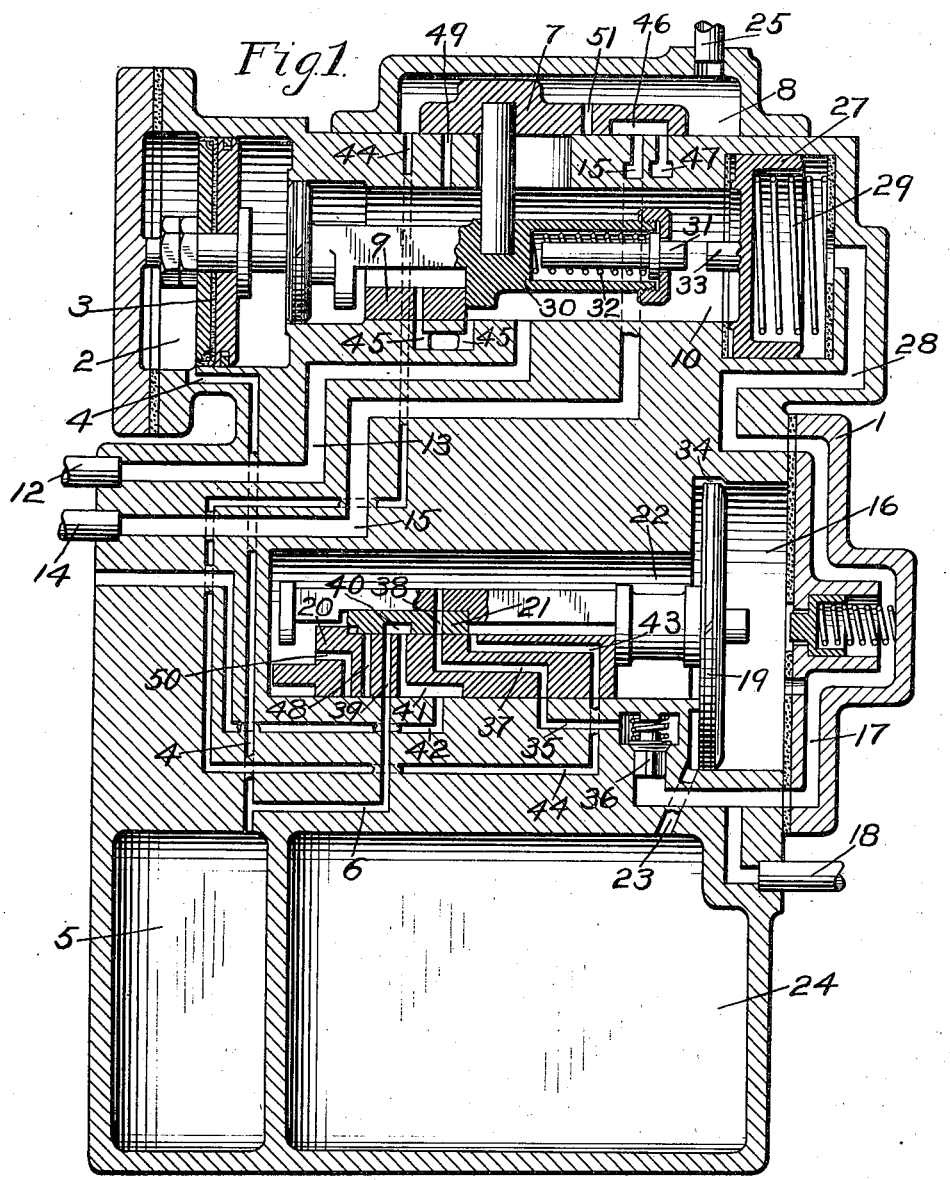
Figure 2:
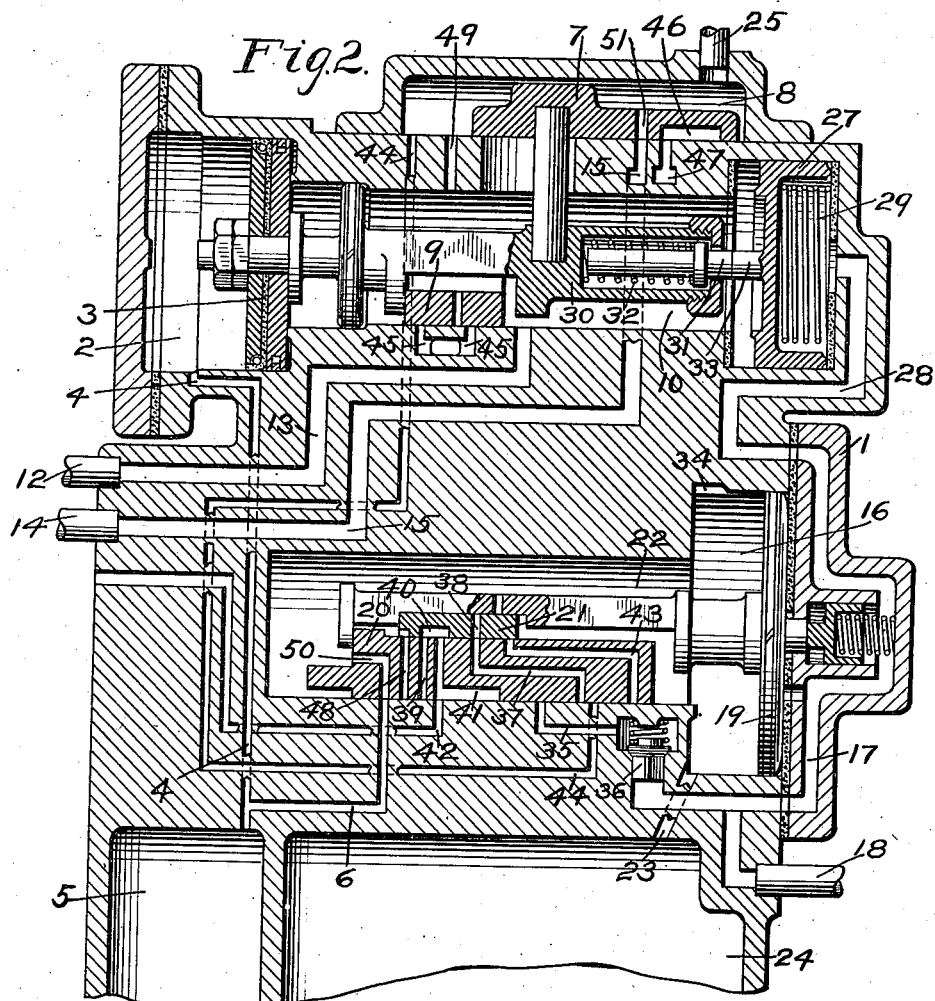
Figure 3:
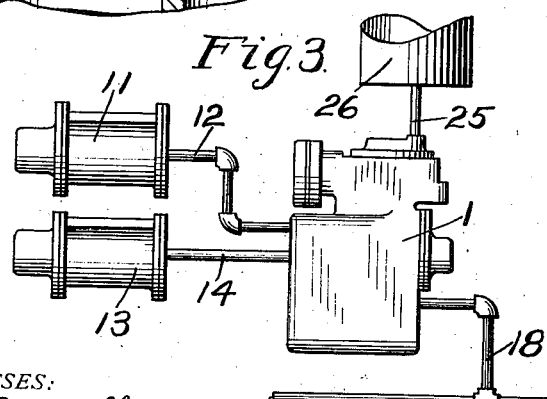

In the accompanying drawings; Figure 1 is a central sectional view of a brake controlling valve device embodying my invention and showing the parts in release position; Fig. 2 a similar view, with a portion broken away, showing the parts in emergency application position; and Fig. 3 a diagrammatic view of a car air brake equipment with the improved brake controlling valve device applied thereto.

According to my invention, an application valve portion controlled by the opposing pressures of an application chamber and the brake cylinder is provided for controlling the admission and release of fluid under pressure to and from the brake cylinders and an equalizing valve device subject to variations in brake pipe pressure controls the pressure in the application chamber.

As shown in the drawings, the brake controlling valve device may comprise a casing 1 having an application cylinder 2 containing a piston 3 and connected by a passage 4 to application chamber 5, a branch passage 6 leading from passage 4 to the seat of the main slide valve of the equalizing valve device. The piston 3 operates a supply valve 7, contained in valve chamber 8 and an exhaust valve 9 contained in valve chamber 10. A service brake cylinder 11 is connected by pipe 12 and passage 13 to valve chamber 10 and emergency brake cylinder 13 communicates through pipe 14 with a passage 15, leading to the seat of supply valve 7. The casing 1 also has a piston chamber 16 connected by passage 17 to brake pipe 18 and containing triple valve piston 19. The piston 19 operates a main slide valve 20 and a graduating slide valve 21 contained in valve chamber 22 which is open through passage 23 to a pressure chamber 24. The valve chamber 8 is connected by pipe 25 with a supply reservoir 26.

According to my invention, the application piston 3 has two application positions, one for service and the other for emergency applications and in order to define the service position, a movable stop device is provided which may comprise a double seating piston 27 having a passage 28 leading from the brake pipe passage 17 to one side and subject to the pressure of a spring 29 tending to maintain same at its inner seat.

The piston stem 30 of the piston 3 is made hollow and contains a yielding stop 31 subject to the pressure of a spring 32 and adapted to engage a projecting stem 33 carried by the piston 27.

In operation, the brake pipe 18 being supplied with fluid under pressure in the usual way, the valve chamber 22 is supplied with fluid from the brake pipe through feed groove 34 and the pressure chamber 24 is charged from said valve chamber through passages 23. A quick recharging passage 35 containing check valve 36 may also be employed, said passage being connected to the valve chamber 22 through ports 37 and 38 in the slide valves 20 and 21 when the parts are in normal release position, as shown in Fig. 1 of the drawings.

In release position, the application chamber 5 and the application cylinder 2 are connected to the atmosphere through passage 6, port 39, cavity 40 in the auxiliary valve 21, port 41, and atmospheric exhaust passage 42. The valve chamber 8 and consequently the reservoir 26 may be charged with fluid under pressure from the valve chamber 22 through port 43 and passage 44.

In the release position of the application portion, the valve chamber 10 and the service brake cylinder 11 are open to the atmosphere through exhaust ports 45 controlled by the exhaust valve 9 and the emergency brake cylinder passage is connected to the exhaust through passage 15, cavity 46 in the supply valve 7 and exhaust port 47.

In order to effect a service application of the brakes, a gradual reduction in brake pipe pressure is made and the equalizing piston 19 is then shifted to service application position, the initial movement of the piston first operating the auxiliary valve 21 to cut off the exhaust from the application chamber and to close the ports 43 and 37. This movement also uncovers the service port 48 and in service position said port registers with the passage 6, so that fluid from valve chamber 22 and pressure chamber 24 flows to the application chamber 5 and application cylinder 2.

The fluid supplied to application cylinder 2 thereupon moves the piston 3 until the stem 31 engages the stem 33. By this movement the exhaust ports 45 are first closed by the exhaust valve 9 and the port 49 is then uncovered by the movement of the supply valve 7, so that fluid from the reservoir 26 is supplied to valve chamber 10 and thence through passage 13 to the service brake cylinder 11, it being noted that in order to open the port 49, the stem 31 must be forced back against the spring 32.

When the pressure in the pressure chamber 24 has been reduced by equalization into the application chamber 5 to a point slightly lower than the brake pipe pressure, the triple valve piston 19 operates to shift the graduating valve 21 and close the service port 48.

Fluid continues to flow to the service brake cylinder 11 until the brake cylinder pressure substantially equals the pressure in the application cylinder and application chamber, when the application piston 3 is moved back, causing the supply valve 7 to lap the port 49.

The service brake cylinder pressure may be increased as desired, by making further reductions in brake pipe pressure, so as to again effect the opening of the service port 48 and thus increase the pressure in the application chamber, which causes the movement of the application piston 3 to again open the supply port 49.

It will be noted that the exhaust cavity 46 is extended, so that during service applications, the emergency brake cylinder is kept connected with the exhaust port 47.

If an emergency application of the brakes is desired, a sudden reduction in brake pipe pressure is effected, so that the equalizing piston 19 is shifted to emergency application position, as shown in Fig. 2 of the drawings. In this position, emergency port 50 registers with passage 6, so that fluid from the pressure chamber 24 is supplied to the application chamber. In an emergency application, the flow of air from the pressure chamber to the application cylinder is rapid, corresponding with the rapid rate of reduction in brake pipe pressure, and in consequence a high pressure is quickly built up on the application piston before the brake cylinder pressure has had time to rise to any considerable degree, and since the piston 3 is of greater area than the stop piston 27, this in connection with the rapid falling of brake pipe pressure on the back of the stop piston results in the movement of the stop piston by the application piston 3, so that the parts assume the positions shown in Fig. 2 of the drawings. In this position, fluid flows from the reservoir 26 to the service brake cylinder 11 as in a service application of the brakes and in addition, the further movement of the supply valve 7 operates to cut off the exhaust from the emergency brake cylinder 13 and then connect port 51 with passage 15, so that fluid from the reservoir 26 is also supplied to the emergency brake cylinder. It will thus be seen that in an emergency application of the brakes, both brake cylinders are supplied with fluid under pressure to thereby secure a high braking power.

Having now described my invention, what I claim as new and desire to secure by Letters Patent, is:

1. In a fluid pressure brake, the combination with an application chamber, of a valve device subject to the opposing pressures of the application chamber and the brake cylinder for controlling the application of the brakes and having a service application position and an emergency application position in which the brakes are applied with increased power.

2. In a fluid pressure brake, the combination with an application chamber, of a valve device subject to the opposing pressures of the application chamber and the brake cylinder for controlling the application of the brakes and having a service application position and an emergency application position in which the brakes are applied with increased power, and a movable stop device for defining the service application position.

3. In a fluid pressure brake, the combination with two brake cylinders, of a valve device subject to the opposing pressures of an application chamber and one brake cylinder and having a service position for supplying fluid to one brake cylinder and an emergency application position for supplying fluid to both brake cylinders.

4. In a fluid pressure brake, the combination with two brake cylinders, of a valve device subject to the opposing pressures of an application chamber and one brake cylinder and having a service position for supplying fluid to one brake cylinder and an emergency application for supplying fluid to both brake cylinders, and a yielding stop device for defining the service application position.

5. In a fluid pressure brake, the combination with a brake pipe, of two brake cylinders, an application chamber, a valve mechanism subject to the pressure in the application chamber for supplying fluid to one brake cylinder in one position and having another position for supplying fluid to both brake cylinders, and an equalizing valve device operated upon a gradual reduction in brake pipe pressure for supplying fluid to the application chamber at a gradual rate to effect the movement of said valve mechanism to the position for supplying fluid to one brake cylinder and operated upon a sudden reduction in brake-pipe pressure for supplying fluid to the application chamber at a greater rate to effect the movement of said valve mechanism to the position for supplying fluid to both brake cylinders.

6. In a fluid pressure brake, the combination with a brake pipe, of two brake cylinders, an application chamber, a valve device subject to the pressure in the application chamber and operated by a gradual increase in pressure therein for supplying fluid to one brake cylinder and by a more rapid increase in pressure for supplying fluid to both brake cylinders, and a stop device subject to brake pipe pressure for holding the valve device in the position for supplying fluid to one brake cylinder.

7. In a fluid pressure brake, the combination with a brake pipe, of two brake cylinders, an application chamber, a valve device subject to the pressure in the application chamber and operated by a gradual increase in pressure therein for supplying fluid to one brake cylinder and by a more rapid increase in pressure for supplying fluid to both brake cylinders, and a stop device subject on one side to brake pipe pressure for holding the valve device in the position for supplying fluid to one brake cylinder upon a gradual increase in application chamber pressure and adapted to yield and permit movement of said valve device to the position for supplying fluid to both brake cylinders upon a more rapid increase in application chamber pressure.

8. In a fluid pressure brake, the combination with two brake cylinders, of an application chamber and an application valve device operated by an increase of pressure in the application chamber for supplying fluid to one brake cylinder in one position and another position for supplying fluid to both brake cylinders.

9. An application valve device comprising an application chamber, a valve mechanism operated by the pressure in the application chamber for supplying fluid to one brake cylinder in one position and to two brake cylinders in another position, and a triple valve device operated by variation in brake pipe pressure for controlling the supply of fluid to said application chamber.

In testimony whereof I have hereunto set my hand.

WALTER V. TURNER.

Witnesses:
A. M. CLEMENTS,
S. W. KEEFER.